Aug. 18, 1936. F. E. STAHL Re. 20,074

METHOD OF AND MEANS FOR LOCKINGLY ENGAGING COACTING ELEMENTS

Original Filed June 23, 1933

INVENTOR
FRANK E STAHL
BY J. W. McElis
ATTORNEY

Reissued Aug. 18, 1936 Re. 20,074

UNITED STATES PATENT OFFICE 20,074

METHOD OF AND MEANS FOR LOCKINGLY ENGAGING COACTING ELEMENTS

Frank E. Stahl, Tonawanda, N. Y., assignor to Columbus McKinnon Chain Corporation, Tonawanda, N. Y., a corporation of New York Original application June 23, 1933, Serial No. 677,299. Divided and application August 24, 1934, Serial No. 741,285, now Patent No. 2,025,-556, dated December 24, 1935. This application for reissue July 8, 1936, Serial No. 89,486

3 Claims. (Cl. 29—148)

My invention relates in general to methods of and means for lockingly engaging coacting elements and, in particular, to such methods and means which are applicable for anchoring wire cables.

This is a division of my original application Serial No. 677,299, filed on June 23, 1933.

It is well known to those skilled in the art that cable ends are usually anchored by being passed through a sleeve having a tapered bore after which the wires and strands of the cable are unbraided and separated, and thereafter molten metal of low melting point, such as lead or zinc, is poured into the sleeve and around the wires and the strands. This method is not only expensive, but when the cable is once attached by this method, the anchor can not be conveniently removed. It is also well known that attempts have been made to use wedges around the cable and placed in a tapered sleeve, but such wedges usually are of relatively hard material and do not conform to the wires and strands of the cable, and anchors of this type usually require some additional means for holding the wedges in shape, particularly if slack is likely to occur in the cable.

One of the objects of my invention has been to provide a method which will overcome the disadvantages above pointed out, and one which may be quickly and conveniently practiced either in lockingly engaging or disengaging the coacting elements.

Another object has been to provide a method of securing together two elements of relatively nonductile material by conforming segmental inserts of relatively ductile material to the coacting surfaces of the non-ductile elements.

Another object has been to provide an anchor means made of two metals having different degrees of ductility.

Another object of my invention has been to provide anchor means having a sleeve of relatively non-ductile material and jaws of relatively ductile material, whereby when pressed together and about the cable by axial movement, the inner faces of the jaws will mold themselves or be conformed to the wires and the strands of the cable.

Moreover, my invention is of such a nature that the jaws will be self-locking, since because of their ductile nature they are not only conformed to the outer ribbed surface of the cable, but also to the tapered surface of the sleeve, thus making a perfect fit.

Moreover, when my invention is used on relatively small cable drums, the jaws, because of their ductility, permit the cable to form or shape the edges of the jaws over which the cable is bent so that they will conform substantially to the curvature of the cable, thus preventing the cutting or kinking of the cable at this point.

The above objects and advantages have been accomplished by my invention. In the accompanying drawing, I have shown one form of means for carrying out my method, it being obvious that other forms may be used as hereinafter pointed out. In the drawing.

Figure 1:
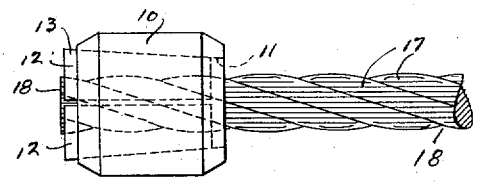
Fig. 1 is an exterior view of my anchor in place upon a cable.
Figure 2:
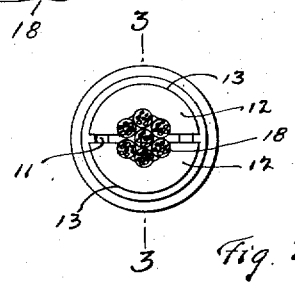
Fig. 2 is an end elevation thereof.
Figure 3:
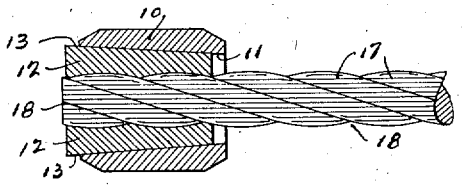
Fig. 3 is a sectional view taken on line 3—3 of Fig. 2.
Figure 5:
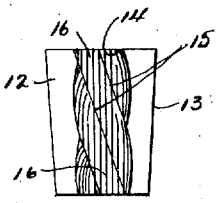
Fig. 5 is a similar view of a jaw which has been used.
Figure 4:
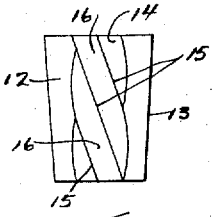
Fig. 4 is a face view of one of the jaws of my anchor before being put into use.

The means shown in the drawing comprises an outer sleeve 10 made preferably of steel or other relatively non-ductile material and which is provided with a tapered bore 11. Jaws 12 are also provided. These jaws are made of some material which is more ductile than the sleeve 10 and I have found that certain bronzes are best suited for the purpose. These jaws are cast and the exterior surface 13 is tapered and made to conform to the tapered bore 11 of the sleeve. In the flat face of each of these jaws is provided a recess 14 of general semi-cylindrical shaps which is provided with a plurality of ridges 15 between which are formed a number of semi-cylindrical helically arranged grooves 16 which conform substantially to the shape and angle of the strands 17 of the cable 18. These ridges and grooves are relatively roughly formed and serve in general to conform to the cable when put in place. As shown in the drawing, but two jaws 13 are employed, but it is obvious that where a larger cable is to be anchored more segmental jaws may be used to complete the circle.

In carrying out my method by the device shown, the jaws 12 are placed about the cable with the grooves 16 thereof in registration with the strands 17 of the cable, and the sleeve 10 which has previously been slipped over the end of the cable is brought up into engagement with the tapered surfaces 13 of the jaws. The assembly is then preferably placed within an arbor press whereby the sleeve with its cone-shaped bore 11 is forced along on the jaws. Obviously, while this is a convenient form of assembling, the jaws may be forced into the sleeve by any other suitable means. As the jaws are forced into the sleeve the outer surfaces thereof are brought into absolute conformity to the tapered surface of the bore 11 of the sleeve, and the ridges 15 and grooves 16 of the semi-cylindrical recesses 14 of the jaws are forced into intimate contact with the wires of the strands 17, thus causing these wires to be embedded in the faces of the grooves 16 and bringing the jaws in perfect conformity to the shape of the cable. It will be clear, therefore, that because of the ductility of the metal of the jaws, they are changed in shape or molded by compression so as to conform to the coacting surfaces of the sleeve and cable. Since the jaws are thus forced into engagement with the small wires of the strands they not only grip the cable to a maximum degree, but they are so intimately engaged with the wires and strands of the cable that they are securely locked thereon and prevented from becoming disengaged. Furthermore, since the tapered surface 13 is also brought into exact conformity with the tapered bore 11 of the sleeve, the jaws will be firmly held in place by the coaction of these tapered surfaces, in well known manner. By reason of the compressive action brought about upon the jaws during the assembling of the device, the density of the metal thereof is increased, with the result that the strength of the metal on the gripping surfaces will also be increased. Furthermore, as the jaws 12 are being forced within the sleeve or shell 10, the cable is being compressed somewhat and to such a degree that the strands of the cable which are engaged by the jaws are tightly forced in contact with each other so that a substantially solid ring is formed. This compression or collapse of the cable is thus initially brought about and is of a degree substantially equal to the collapsibility which would be caused by the estimated load capacity of the cable, whereby, when the estimated load is placed upon the cable, the size of the cable will remain unchanged because there will be no further collapsing action thereof. Should it be desired to remove my anchor from the cable, it is only necessary to force the sleeve in an opposite direction.

Figure 7:
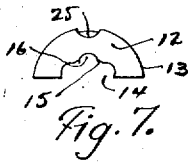
Fig. 7 is an end view of a jaw of slightly modified form.
Figure 8:
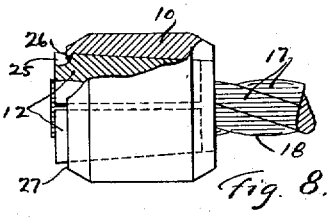
Fig. 8 is a fragmentary, side, sectional elevation showing auxiliary locking means for the jaws.

In some cases it may be desirable to further lock the jaws 12 within the sleeve 10, and a very convenient way of doing this is shown in Figs. 7 and 8. Each of the jaws is provided in its outer periphery with a notch 25. Projections 26 engaging with the notches 25 are formed from the rim 27 of the sleeve, at points opposite the notches, by peening or otherwise, thus preventing endwise movement of the jaws and providing a supplemental lock for the complete assembly.

Figure 6:
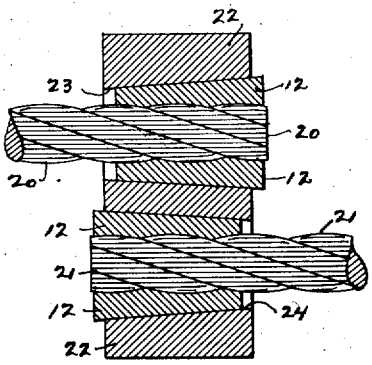
Fig. 6 shows a modification of my invention as applied to a cable connector.

In Fig. 6 I show a connector and two cables 20 and 21. This comprises a casing 22 having two oppositely arranged tapered bores 23 and 24. In each of these bores is arranged a number of jaws 12. It will be seen that after the jaws are formed or compressed in place within the casing 22, the ends of the two cables will thus be firmly and conveniently united. If for any reason it becomes necessary to remove the anchor from the cable this may be accomplished in a very easy and convenient manner without injury to either the cable or the anchor.

While I have described the sleeve 10 as made of steel and the jaws 12 as made of bronze, various other materials may be used so long as there is a difference of ductility which will permit the jaws to conform as hereinbefore described. Wherever in the specification and claims the term cable is used, it is to be understood that my invention is applicable not only to cables but to any rod or bar of relatively non-ductile material having a surface of such nature that the jaws of relatively ductile material will, under pressure, be shaped to conform to it, and the description as applied to cables is only an illustrative example of one use of my invention. Furthermore, while I have shown a sleeve with a tapered bore and jaws with tapered exterior surfaces, it will be clear that my invention, because of the ductile nature of the jaws, may have a sleeve with a cylindrical bore and tapered jaws or a sleeve with a tapered bore and straight jaws.

These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A method of attaching a multi-strand cable to an anchor, such anchor having a relatively non-ductile sleeve formed with a tapered bore, and a plurality of relatively ductile jaws, comprising the preforming of the jaws with spiral grooves to fit the strands of the cable, then placing the jaws upon the cable, and then forging the respective surfaces of the jaws to conform to the individual wires of the cable and to the bore of the sleeve by an axial movement of the sleeve over the jaws and cable.

2. A method of attaching a multi-strand cable to an anchor, such anchor having a relatively non-ductile sleeve formed with a tapered bore, and a plurality of relatively ductile jaws, comprising the preforming of the jaws with spiral grooves to fit the strands of the cable, then placing the jaws upon the cable, and then compressing the cable and forging the respective surfaces of the jaws to conform to the individual wires of the cable and to the bore of the sleeve by an axial movement of the sleeve over the jaws and cable.

3. In a device of the character described, an anchor for multi-strand cables, comprising an outer sleeve of relatively non-ductile material, said sleeve being formed with a central, tapered bore, and a plurality of locking jaws of relatively ductile material, each of said jaws having an interior surface initially formed with substantially smooth spiral grooves to fit only the strands of the cable and with an exterior surface of substantially the same taper as the said bore but larger in diameter, the interior surfaces of the jaws being caused to conform to the contours of the individual wires of the cable by uniform forging effected by their assembly by relatively axial movement.

FRANK E. STAHL.